(12) United States Patent
Liu

(10) Patent No.: US 8,965,275 B2
(45) Date of Patent: Feb. 24, 2015

(54) DONOR ANTENNA DEVICE, SERVICE ANTENNA DEVICE USED IN WIRELESS RELAY SYSTEM AND SIGNAL TRANSMISSION METHOD OF THE SAME

(71) Applicant: Accton Technology Corporation, Hsinchu (TW)

(72) Inventor: I-Ru Liu, Taipei (TW)

(73) Assignee: Accton Technology Corporation, Hsinchu (TW)

( * ) Notice: Subject to any disclaimer, the term of this patent is extended or adjusted under 35 U.S.C. 154(b) by 160 days.

(21) Appl. No.: 13/861,404

(22) Filed: Apr. 12, 2013

(65) Prior Publication Data
US 2013/0273841 A1  Oct. 17, 2013

(30) Foreign Application Priority Data
Apr. 13, 2012  (TW) .............. 101113269 A

(51) Int. Cl.
*H04B 7/15*  (2006.01)
*H04B 7/155*  (2006.01)

(52) U.S. Cl.
CPC .......... *H04B 7/15557* (2013.01); *H04B 7/1555* (2013.01)
USPC ............................ 455/11.1; 455/13.1; 455/16

(58) Field of Classification Search
USPC ................ 455/3.02, 427, 428, 430, 431, 7–9, 455/11.1, 12.1, 13.1, 13.2, 14–17; 340/425.1; 370/226, 293, 246, 274, 370/279, 315, 316, 492, 501
See application file for complete search history.

(56) References Cited

U.S. PATENT DOCUMENTS

| | | | |
|---|---|---|---|
| 6,081,232 A * | 6/2000 | Pittman et al. .................. 342/368 |
| 8,363,679 B2 * | 1/2013 | Sorenson et al. ............. 370/503 |
| 8,737,300 B2 * | 5/2014 | Stapleton et al. ............. 370/328 |
| 2008/0293360 A1 * | 11/2008 | Maslennikov et al. .......... 455/24 |
| 2010/0109771 A1 * | 5/2010 | Baik et al. ...................... 330/149 |
| 2013/0195469 A1 * | 8/2013 | Berg et al. ..................... 398/131 |

* cited by examiner

*Primary Examiner* — Dominic E Rego
(74) *Attorney, Agent, or Firm* — CKC & Partners Co., Ltd.

(57) ABSTRACT

A signal transmission method used in a donor or a service antenna device in a wireless relay station is provided. The signal transmission method comprises receiving a first and a second direction signals by using an antenna and an optical transmission module. Each of a plurality of band filters performs filtering on the first direction signal. A control unit determines a transmission mode of the first signal according to the band of it. The control unit activates one of a plurality of first direction filters and one of a plurality of second direction filters between the antenna and the optical transmission module according to the transmission mode. The first and the second direction signal are transmitted to a remote device and an optical fiber connected device through the antenna and the optical transmission module. A donor antenna device and a service antenna device are disclosed herein as well.

15 Claims, 4 Drawing Sheets

| Filter Mode/State | F1 | F2 | F31 | F4 |
|---|---|---|---|---|
| Standby | DC | DC | DC | DC |
| FDD Uplink | 1 | 0 | 1 | 0 |
| TDD Uplink | 0 | 0 | 1 | 1 |
| FDD/TDD downlink or No signal | 0 | 0 | 0 | 0 |
| Interference /noise/error | Other combinations | | | |

FIG. 3

| Filter Mode/State | First direction (F4) | First direction (F1) | Second direction (F4) | First direction (F2) |
|---|---|---|---|---|
| Standby | Previous mode | Previous mode | Previous mode | Previous mode |
| Determining | Activated | Activated | Activated | Activated |
| FDD | Deactivated | Activated | Deactivated | Activated |
| TDD | Activated | Activated | Activated | Deactivated |

FIG. 4

DONOR ANTENNA DEVICE, SERVICE ANTENNA DEVICE USED IN WIRELESS RELAY SYSTEM AND SIGNAL TRANSMISSION METHOD OF THE SAME

RELATED APPLICATIONS

This application claims priority to Taiwan Application Serial Number 101113269, filed Apr. 13, 2012, which is herein incorporated by reference.

BACKGROUND

1. Technical Field

The present disclosure relates to a communication technology. More particularly, the present disclosure relates to a wireless relay station and a signal transmission method of the same.

2. Description of Related Art

Wireless communication technology and physical network communication technology are two main modem communication technologies. The wireless communication technology receives or transmits wireless signals by an antenna and the wireless communication technology becomes popular because it is not limited by the physical wires.

In prevalent wireless communication systems, a mobile device can access wireless network through a base station to communicate with other network devices. However, obstacles disposed between the mobile device and the base station may block the signals transmitted between the two devices sometimes. Accordingly, a wireless relay station can be disposed at a proper position such that the mobile device and the base station can communicate with each other through the wireless relay station without obstruction. Nevertheless, the signal transmission modes adapted by different Internet service providers may not be the same. Though the mobile device can communicate with the base station of a corresponding Internet service provider, the wireless relay station may receive the signals from different Internet service providers and may not have the ability to deal with the signals of different transmission modes. The complexity and difficulty of the signal transmission thus rise.

Accordingly, what we needed are a wireless relay system and the signal transmission method of the same that efficiently switch from different transmission modes with the lower cost.

SUMMARY

An aspect of the present disclosure is to provide a donor antenna device used in a wireless relay station. The donor antenna device comprises an antenna, an optical communication module, a first direction transmission module and a second direction transmission module. One of the antenna and the optical communication module receives a first direction signal and the other one of the antenna and the optical communication module receives a second direction signal. The first direction transmission module comprises a plurality of band filters, a control unit and a plurality of first direction filtering units. Each band filter is corresponding to a specific frequency band and performs a filtering process of the first direction signal to generate a filtering result. The control unit receives the filtering result from the band filter to determine a frequency band that the first direction signal corresponds to. Furthermore, the control unit determines a transmission mode of the first direction signal. The first direction filtering units are connected in parallel between the antenna and the optical communication module. The second direction transmission module comprises a plurality of second direction filtering units connected in parallel between the antenna and the optical communication module. The control unit controls and activates one of the first direction filtering units and one of the second direction filtering units corresponding to the transmission mode of the first direction signal to transmit the first direction signal and the second direction signal to a remote device and an optical fiber-connected device through the antenna and the optical communication module respectively.

Another aspect of the present disclosure is to provide a service antenna device used in a wireless relay station. The service antenna device comprises an antenna, an optical communication module, a first direction transmission module and a second direction transmission module. One of the antenna and the optical communication module receives a first direction signal and the other one of the antenna and the optical communication module receives a second direction signal. The first direction transmission module comprises a plurality of band filters, a control unit and a plurality of first direction filtering units. Each band filter is corresponding to a specific frequency band and performs a filtering process of the first direction signal to generate a filtering result. The control unit receives the filtering result from the band filter to determine a frequency band that the first direction signal corresponds to. Furthermore, the control unit determines a transmission mode of the first direction signal. The first direction filtering units are connected in parallel between the antenna and the optical communication module. The second direction transmission module comprises a plurality of second direction filtering units connected in parallel between the antenna and the optical communication module. The control unit controls and activates one of the first direction filtering units and one of the second direction filtering units corresponding to the transmission mode of the first direction signal to transmit the first direction signal and the second direction signal to a remote device and an optical fiber-connected device through the antenna and the optical communication module respectively.

Yet another aspect of the present disclosure is to provide a signal transmission method used in a donor antenna device or a service antenna device of a wireless relay station. The signal transmission method comprises the steps outlined below. A first direction signal is received by one of an antenna and an optical transmission module of the donor antenna device or the service antenna device and second direction signal is received by the other one of the antenna and the optical transmission module. A filtering process is performed to the first direction signal by each of a plurality of band filters corresponding to a specific frequency band to generate a filtering result. A frequency band of the first direction signal is determined according to the filtering result, and a transmission mode of the first direction signal is further determined. One of the first direction filters and one of the second direction filters connected between the antenna and the optical transmission module are controlled and activated according to the transmission mode of the first direction signal. The first direction signal and the second direction signal are transmitted to a remote device and an optical fiber-connected device through the antenna and the optical transmission module respectively.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows:

FIG. 3 is a diagram depicting the truth table of the filtering result of each of the band filters in FIG. 2 in an embodiment of the present disclosure;

FIG. 4 is a table of operation condition of the first direction filtering units and the second direction filtering units in an embodiment of the present disclosure.

DETAILED DESCRIPTION

Figure 1:
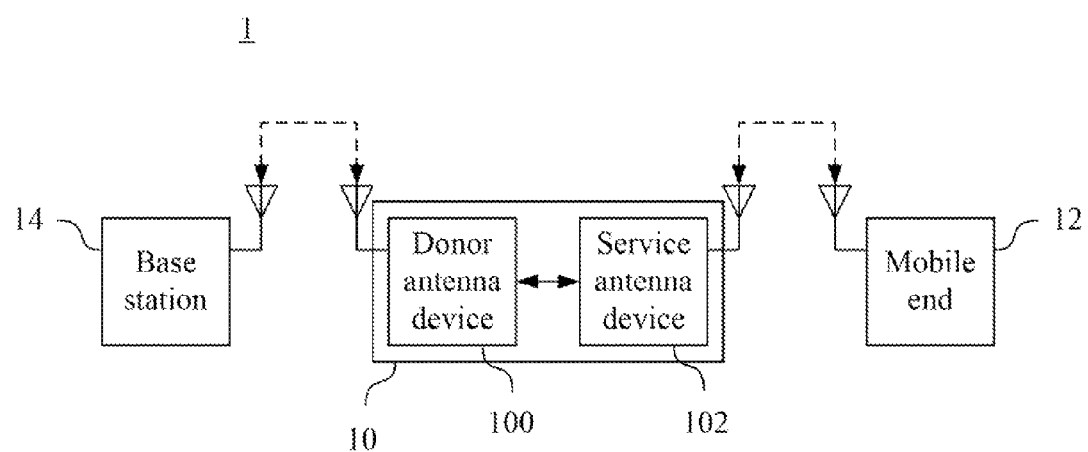
FIG. 1 is a block diagram of a wireless communication system in an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a block diagram of a wireless communication system 1 in an embodiment of the present disclosure. The wireless communication system 1 comprises a wireless relay station 10, a mobile end 12 and a base station 14.

The mobile end 12 can be a handheld electronic device such as a mobile phone, a tablet PC or a computer system equipped with a wireless communication device. The mobile end 12 can access wireless network through the base station 14 to communicate with other network devices. However, obstacles between the mobile end 12 and the base station 14 may block the signals transmission. Accordingly, a wireless relay station 10 can be disposed at a proper position such that the mobile end 12 and the base station 14 can communicate with each other through the wireless relay station 10 without obstruction.

In the present embodiment, the wireless relay station 10 comprises a donor antenna device 100 and a service antenna device 102. The donor antenna device 100 communicates with the base station 14 and the service antenna device 102 communicates with the mobile end 12. The donor antenna device 100 and the service antenna device 102 can be connected through optical fibers to perform data transmission. For example, after receiving a wireless signal from the mobile end 10, the service antenna device 102 converts the received wireless signal from an electrical signal to an optical signal and transmits the signal to the donor antenna device 100 through the optical fibers, then the donor antenna device 10 transmits the signal to the base station 14. Similarly, in an opposite transmission direction, the donor antenna device 100 can receive the signal from the base station 14 and transmit the signal to the service antenna device 102 through the optical fibers and further to the mobile end 12. In the present embodiment, the donor antenna device 100 and the service antenna device 102 are two independent systems to prevent the interference of receiving and transmitting signals between the two devices.

Figure 2:
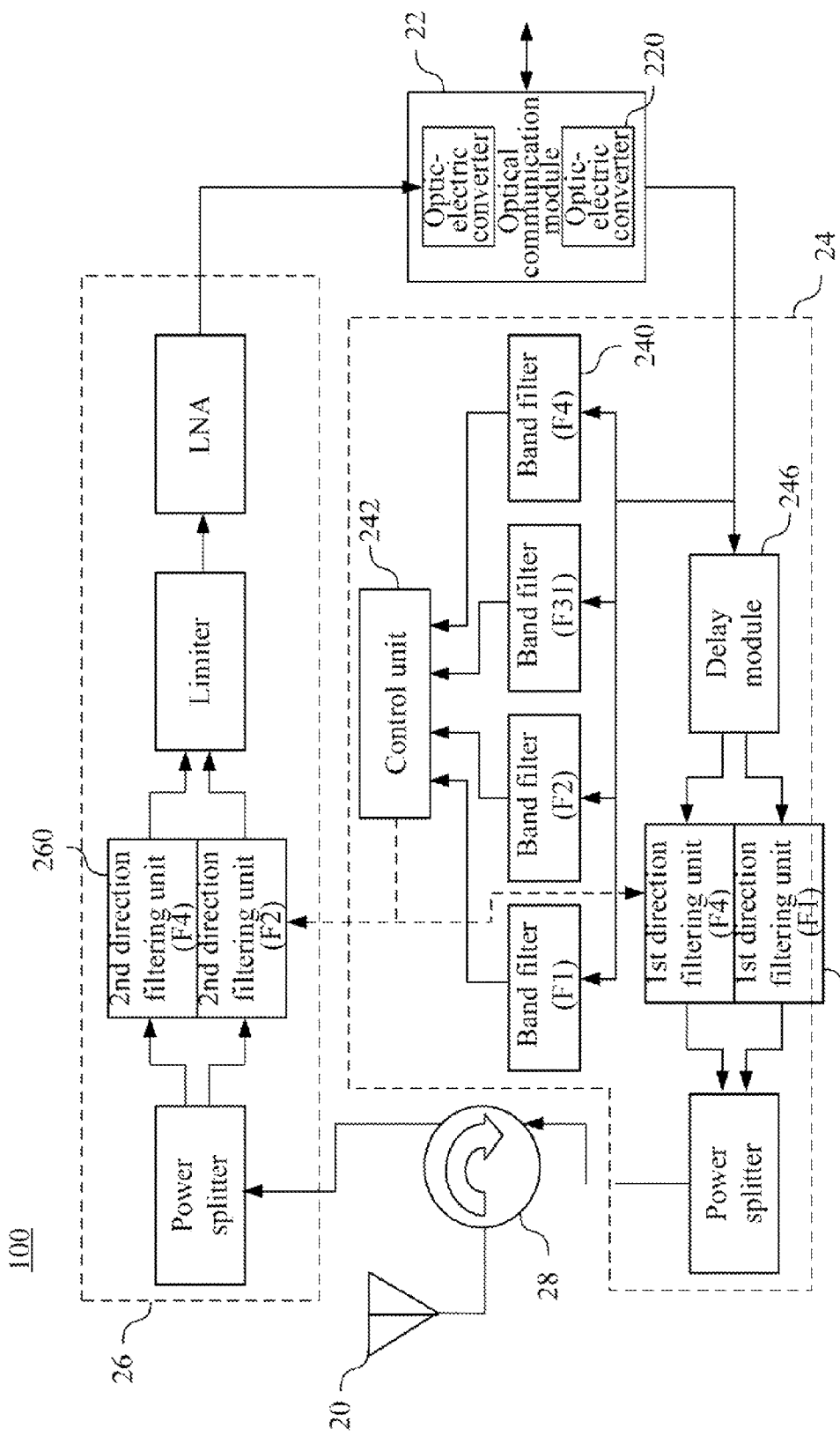
FIG. 2 is a block diagram of a donor antenna device in FIG. 1 in an embodiment of the present disclosure.

FIG. 2 is a block diagram of a donor antenna device 100 in FIG. 1 in an embodiment of the present disclosure. The donor antenna device 100 comprises an antenna 20, an optical communication module 22, a first direction transmission module 24 and a second direction transmission module 26.

In the present embodiment, the donor antenna device 100 and the vice antenna device 102 are connected through the optical fibers. Hence, the optical communication module 22 receives a first direction signal which is a transmitted signal from the service antenna device 102 through the optical fibers and transmits the first direction signal to the antenna 20 through the first direction transmission module 24 that acts as a data-transmission module (TX). The first direction signal is further transmitted to the remote base station 14 through the antenna 20. On the other hand, the antenna 20 receives a second direction signal which is a received signal and transmits the second direction signal to the optical communication module 22 through the second direction transmission module 26 that acts as a data-reception module (RX). The second direction signal is further transmitted to the service antenna device 102. In an embodiment, the optical communication module 22 further comprises a wavelength division multiplexer and/or an optical power splitter. The optical transmission module 22 further comprises an optic-electrical converter 220 to perform an optic-electrical conversion on the first direction signal and the second direction signal. Between the antenna 20 and the first direction transmission module 24 and between the antenna 20 and the second direction transmission module 26, a circulator 28 is disposed such that the first direction signal and the second direction signal can be transmitted through the circulator 28 to prevent the interference of the signals in other transmission paths.

The first direction transmission module 24 comprises a plurality of band filters 240, a control unit 242 and a plurality of first direction filtering units 244.

In different embodiments, the number of the band filters 240 can be different. In the present embodiment, there are four band filters 240 each corresponding to a specific frequency band, F1, F2, F31 and F4, in which the frequency band F1 ranges from 2500 MHz to 2570 MHz, the frequency band F2 ranges from 2620 MHz to 2690 MHz, the frequency band F31 ranges from 2500 MHz to 2620 MHz and the frequency band F4 ranges from 2570 MHz to 2620 MHz.

The antenna 20 and the optical transmission module 22 can receive the wireless signals of different transmission modes. Each of the transmission modes corresponds to a specific and different frequency band to prevent the interference between the signals. For example, the frequency band F1 ranging from 2500 MHz to 2570 MHz is an uplink frequency-division duplex (FDD) mode (frequency band 7). The frequency band F2 ranging from 2620 MHz to 2690 MHz is a downlink frequency-division duplex mode (frequency band 38). The frequency band F4 ranging from 2570 MHz to 2620 MHz is an uplink time-division duplex (TDD) mode (frequency band 7).

FIG. 3 is a diagram depicting the truth table of the filtering result of each of the band filters 240 in FIG. 2 in an embodiment of the present disclosure. It is noted that the term 'DC' shown in FIG. 3 represents the state of "don't care". FIG. 3 shows the filtering result of the first direction signal filtered by the band filters 240 in different transmission modes. The control unit 242 can further determine the frequency band of the first direction signal according to the filtering result. In a standby state, e.g. when the donor antenna device 100 just starts up, the filtering result of each of the band filters can be an arbitrary value. In normal operation, if the filtering result of the band filters corresponding to the frequency bands F1, F2, F31 and F4 is (1, 0, 1, 0), means that signals pass through the band filters merely corresponding to the frequency band F1 (ranging from 2500 MHz to 2570 MHz) and F31 (2570 MHz to 2620 MHz). The control unit 242 can determine that the first direction signal actually corresponds to the frequency band ranging from 2500 MHz to 2570 MHz, which further corresponds to the uplink of the frequency-division duplex mode (frequency band 7). Accordingly, the control unit 242 can determine that the transmission mode of the first direction signal is the uplink of the frequency-division duplex mode. When the filtering result of the band filters corresponds to other possible combinations depicted in the truth table of FIG. 3 the control unit 242 can use the similar approach to determine the transmission mode of the first direction signal. Hence, the detail of the determination of the transmission mode corresponding to other combinations is not described herein again.

Referring back to FIG. 2, the first direction filtering units 244 are connected in parallel between the antenna 20 and the optical communication module 22. The number of the first direction filtering units 244 can be the determined according to the number of the transmission modes that the system provides. In the present embodiment, the first direction transmission module 24 comprises the first direction filtering units 244 that allows the frequency bands, F1 and F4, to pass through. In other words, the control unit 242 of the first direction transmission module 24 can select one of the signal of the uplink of the frequency-division duplex mode and the signal of the time-division duplex mode (which is uplink also in the present embodiment) to pass through the corresponding first direction filtering unit 244. When the transmission mode of the currently transmitting first direction signal is determined as the uplink of the frequency-division duplex mode by the control unit 242, the control unit 242 can activate the first direction filtering unit 244 corresponding to the frequency band F1 and deactivate the first direction filtering unit 244 corresponding to the frequency band F4, On the other hand, when the transmission mode of the currently transmitting first direction signal is determined as the time-division duplex mode, the control unit 242 can activate the first direction filtering unit 244 corresponding to the frequency band F4 and deactivate the first direction filtering unit 244 corresponding to the frequency band F1. Hence, the signals of different transmission modes can be transmitted by the same donor antenna device 100.

In an embodiment, a delay module 246 is deposed on the transmission path that the first direction filtering units 244 locate on and the delay module 246 postpones the first direction signal such that the first direction signal reaches the first direction filtering units 244 after the operation of the band filters 240 and the control unit 242 is finished. The delay module 246 can be implemented by a latch circuit or a plurality of inverters (even number) connected in series such that the time of the first direction signal reaching the first direction filtering units 244 is deferred. In other embodiments, a digital-to-analog converter (not shown) may be disposed on the transmission path between the optical communication module 22 and the first direction filtering units 244 such that a digital-to-analog conversion is performed on the first direction signal received by the optical communication module 22. The first direction signal is transmitted to the first direction filtering units 244 after the conversion by the digital-to-analog converter. In other embodiments, other modules may be disposed on the transmission path, for example, a power amplifier, a power splitter and so on, to assist the transmission of the signal.

The second direction transmission module 26 comprises a plurality of second direction filtering units 260 connected in parallel between the antenna 20 and the optical communication module 22. The number of the second direction filtering units 260 can be the determined by the number of the transmission modes that the system provides. In the present embodiment, the second direction transmission module 26 comprises the second direction filtering units 260 that allow the signals of the frequency bands F2 and F4 to pass through. In other words, the second direction transmission module 26 controlled by the control unit 242 can select one of the signal of the downlink of the frequency-division duplex mode and the signal of the time-division duplex mode (which is also downlink in the present embodiment) to pass through the corresponding second direction filtering unit 260. When the transmission mode of the currently transmitting first direction signal is determined to be the uplink of the frequency-division duplex mode by the control unit 242, the control unit 242 can activate the second direction filtering unit 260 corresponding to the frequency band F2 and deactivate the second direction filtering unit 260 corresponding to the frequency band F4. When the transmission mode of the currently transmitting second direction signal is determined to be the time-division duplex mode, the control unit 242 can activate the second direction filtering unit 260 corresponding to the frequency band F4 and deactivate the second direction filtering unit 260 corresponding to the frequency band F2. Hence, the signals of different transmission modes can be transmitted by using the same donor antenna device 100.

In an embodiment, other modules may be disposed on the transmission path that the first direction filtering units 260 locates on such as a low noise amplifier (LNA) and a limiter to assist the transmission of the signal.

FIG. 4 is a table of operation condition of the first direction filtering units 244 and the second direction filtering units 260 in an embodiment of the present disclosure. In the standby status, the first direction filtering units 244 and the second direction filtering units 260 activate or deactivate e according to the previous operation mode. In the determining status, the first direction filtering units 244 and the second direction filtering units 260 are all activated to let the signals pass through. After the transmission mode of the signal is determined, the first direction filtering units 244 and the second direction filtering units 260 are activated or deactivated according to the determined transmission mode.

Therefore, in the donor antenna device 100 of the present disclosure, the transmission modes, TDD or FDD, of the signal can be determined by the control unit of the transmission module of at least one direction, uplink or downlink, according to the frequency band of the signal to select the proper filtering unit to transmit the signal. In an embodiment, the band filters and the control unit can be disposed on both directions of signal transmission paths to detect the direction and enhance the reliability. It is noted that in the above embodiments, the donor antenna device 100 is taken as the example. The approach and technique described above donor antenna device 100 can also be applied to the service antenna device 102 depicted in FIG. 1 after a proper modification of the signal uplink and the downlink path. Hence, the detail of the modification of the service antenna device 102 is not described herein again.

Figure 5:
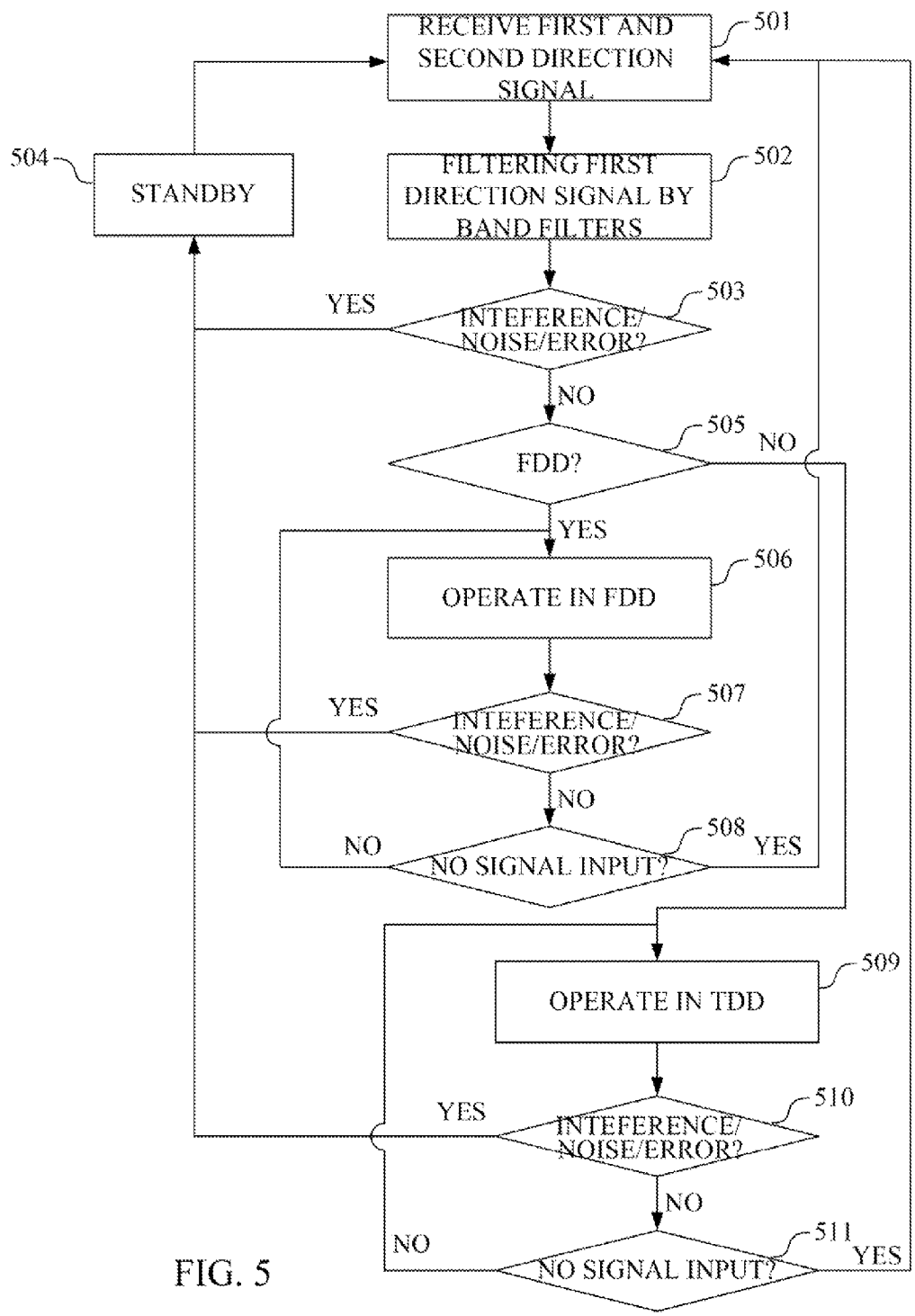
FIG. 5 is a flow chart of a signal transmission method in an embodiment of the present disclosure.

FIG. 5 is a flow chart of a signal transmission method in an embodiment of the present disclosure. The signal transmission method can be applied to the donor antenna device 100 or the service antenna device 102 depicted in FIG. 1. The signal transmission method comprises the steps outlined below (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step 501, a first direction signal is received by one of an antenna 20 and an optical transmission module 22 of the donor antenna device 100 or the service antenna device 102 and a second direction signal is received by the other one of the antenna 20 and the optical transmission module 22.

In step 502, a filtering process is performed on the first direction signal by each of a plurality of band filters 240 corresponding to a specific frequency band. In step 503, whether the condition of interference, noise or error occurs is determined according to the frequency band that the first direction signal corresponds to.

When the condition of interference, noise or error occurs, the flow continues to step 504 such that the system is in a standby mode and returns to step 501 subsequently.

When the condition of interference, noise or error does not occur, whether the transmission mode of the first direction signal is the frequency-division duplex mode is determined in step 505. In an embodiment, the control unit 242 can determine the frequency band of the first signal according to the truth table of the filtering result of the band filters 240 depicted in FIG. 2 to further determine whether the transmission mode of the first direction signal is the frequency-division duplex mode. When the first direction signal is determined to be the frequency-division duplex mode in step 505, the system is operated in frequency-division duplex mode in step 506. Further, whether the condition of interference, noise or error occurs is determined in step 507. When the condition of interference, noise or error occurs, the flow continues to step 504 such that the system is in a standby mode and returns to step 501 subsequently.

When the condition of interference, noise or error does not occur, step 508 further determines whether the input signal corresponding to the frequency-division duplex mode to the first direction filtering unit stops. When the input signal continues, the flow returns to step 505 such that the system is kept operating in the frequency-division duplex mode. When input signal stops, the flow returns to step 501 such that the first and the second direction signal are received to determine the transmission mode again.

When the first direction signal is not the frequency-division duplex mode in step 505, the flow continues to step 509 such that the system operates in the time-division duplex mode. Whether the condition of interference, noise or error occurs is determined in step 510. When the condition of interference, noise or error occurs, the flow continues to step 504 such that the system is in a standby mode and then returns to step 501 subsequently.

When the condition of interference, noise or error does not occur, step 511 further determines whether the input signal corresponding to the time-division duplex mode to the first direction filtering unit stops. When the input signal continues, the flow returns to step 505 such that the system is kept operating in the time-division duplex mode. When input signal stops, the flow returns to step 501 such that the first and the second direction signal are received to determine the transmission mode again.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A donor antenna device used in a wireless relay station, wherein the donor antenna device comprises:
    an antenna;
    an optical communication module, wherein one of the antenna and the optical communication module receives a first direction signal and the other one of the antenna and the optical communication module receives a second direction signal;
    a first direction transmission module comprising:
        a plurality of band filters each corresponding to a specific frequency band and each for performing a filtering process on the first direction signal to generate a filtering result;
        a control unit receiving the filtering result from the band filters to determine a frequency band that the first direction signal corresponds to and a transmission mode of the first direction signal; and
        a plurality of first direction filtering units connected in parallel between the antenna and the optical communication module; and
    a second direction transmission module comprising a plurality of second direction filtering units connected in parallel between the antenna and the optical communication module;
    wherein the control unit activates one of the first direction filtering units and one of the second direction filtering units corresponding to the transmission mode of the first direction signal to transmit the first direction signal and the second direction signal to a remote device and an optical fiber-connected device through the antenna and the optical communication module respectively.

2. The donor antenna device of claim 1, wherein when the first direction signal corresponds to the frequency band ranging from 2570 MHz to 2620 MHz, the transmission mode is determined to be a time-division duplex (TDD) mode.

3. The donor antenna device of claim 1, wherein when the first direction signal corresponds to the frequency band ranging from 2500 MHz to 2570 MHz, the transmission mode is determined to be an uplink frequency-division duplex (FDD) mode.

4. The donor antenna device of claim 1, wherein when the first direction signal corresponds to the frequency band ranging from 2620 MHz to 2690 MHz, the transmission mode is determined to be a downlink frequency-division duplex mode.

5. The donor antenna device of claim 1, wherein the optical transmission module further comprises an optic-electrical converter to perform an optic-electrical conversion of the first direction signal and the second direction signal.

6. The donor antenna device of claim 1, wherein the optical fiber-connected device is a service antenna device of the wireless relay station.

7. The donor antenna device of claim 1, wherein a front-end of the first direction filtering units further comprises a delay module to delay the first direction signal.

8. The donor antenna device of claim 1, further comprising a circulator, wherein the antenna is connected to the first direction filtering units and the second direction filtering units through the circulator.

9. A service antenna device used in a wireless relay station, wherein the service antenna device comprises:
    an antenna;
    an optical communication module, wherein one of the antenna and the optical communication module receives a first direction signal and the other one of the antenna and the optical communication module receives a second direction signal;
    a first direction transmission module comprising:
        a plurality of band filters each corresponding to a specific frequency band and each for performing a filtering process on the first direction signal to generate a filtering result;
        a control unit receiving the filtering result from the band filters to determine a frequency band that the first direction signal corresponds to and a transmission mode of the first direction signal, and a plurality of first direction filtering units connected in parallel between the antenna and the optical communication module; and a second direction transmission module comprising a plurality of second direction filtering units connected in parallel between the antenna and the optical communication module;

wherein the control unit activates one of the first direction filtering units and one of the second direction filtering units corresponding to the transmission mode of the first direction signal to transmit the first direction signal and the second direction signal to a remote device and an optical fiber-connected device through the antenna and the optical communication module respectively.

10. The service antenna device of claim 9, wherein the optical fiber-connected device donor antenna device of the wireless relay station.

11. A signal transmission method applied in a donor or a service antenna device of a wireless relay station, wherein the signal transmission method comprises:

receiving a first direction signal by using one of an antenna and an optical transmission module of the donor antenna device or the service antenna device and receiving a second direction signal by using the other one of the antenna and the optical transmission module;

performing a filtering process to the first direction signal by each of a plurality of band filters corresponding to a specific frequency band to generate a filtering result, determining a frequency band that the first direction signal corresponds to by the filtering result and further determining a transmission mode of the first direction signal;

activating one of a plurality of first direction filters and one of a plurality of second direction filters corresponding to the transmission mode of the first direction signal, wherein the second direction filters are connected between the antenna and the optical transmission module; and transmitting the first direction signal and the second direction signal to a remote device and an optical fiber-connected device through the antenna and the optical transmission module respectively.

12. The signal transmission method of claim 11, wherein when the first direction signal corresponds to the frequency band ranging from 2570 MHz to 2620 MHz, the transmission mode is determined to be a time-division duplex (TDD) mode.

13. The signal transmission method of claim 11, wherein when the first direction signal corresponds to the frequency band ranging from 2500 MHz to 2570 MHz, the transmission mode is determined to be an uplink frequency-division duplex (FDD) mode.

14. The signal transmission method of claim 11, wherein when the first direction signal corresponds to the frequency band ranging from 2620 MHz to 2690 MHz, the transmission mode is determined to be a downlink frequency-division duplex mode.

15. The signal transmission method of claim 11, further comprising delaying the first direction signal at a front-end of the first direction filtering units.

* * * * *